Dec. 13, 1932.  E. A. GAST  1,890,810
ATTACHMENT FOR LAWN MOWERS
Filed July 21, 1931
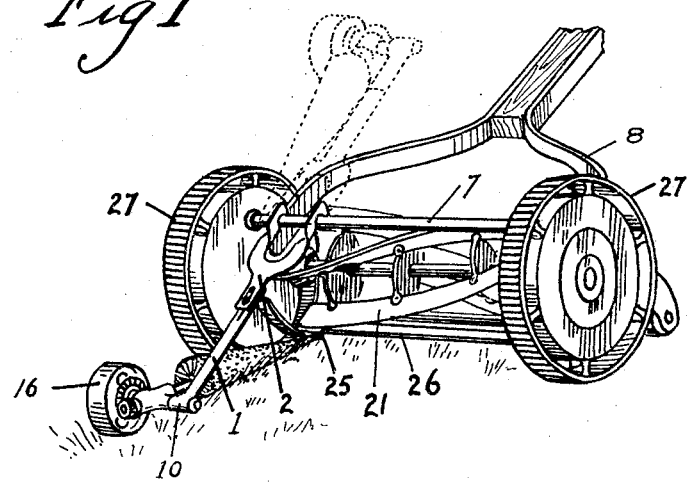
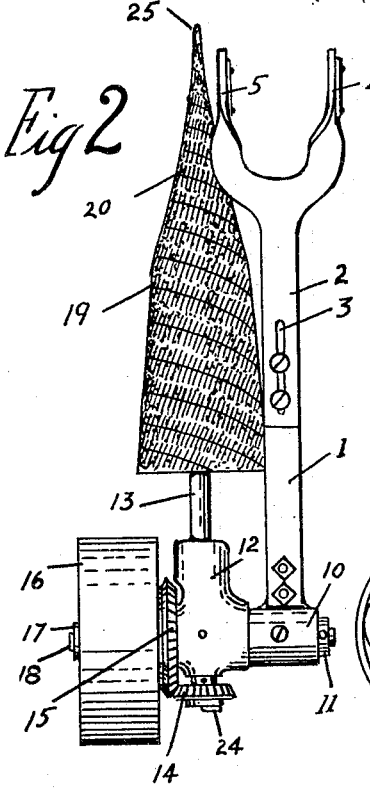
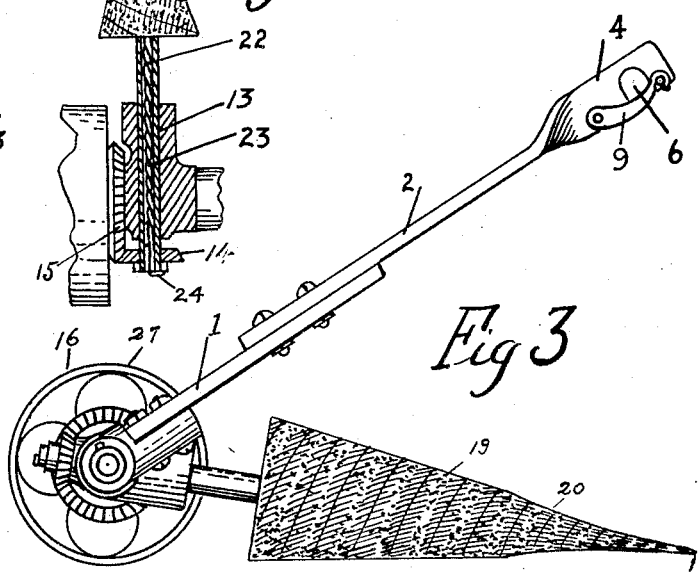
Inventor
Ernest Albert Gast
By Arthur H. Ewald,
Attorney.

Patented Dec. 13, 1932

1,890,810

UNITED STATES PATENT OFFICE

ERNEST ALBERT GAST, OF CINCINNATI, OHIO

ATTACHMENT FOR LAWN MOWERS

Application filed July 21, 1931. Serial No. 552,161.

My invention relates to an attachment for lawn mowers whereby the trimming of the lawn along the edge of a walk, drive or similar structure may be facilitated.

The principal object of my invention is to provide a simple and inexpensive attachment for a lawn mower whereby the operator of the mower may be enabled to trim the grass along the edge of the walk, drive or similar structure without the necessity for a separate operation the trimming being accomplished by the normal operation of the mower.

In the edging of a lawn, it is found difficult to use the ordinary lawn mower for trimming the grass neatly along a walk, drive, or other structure, principally for the reason that the grass along the edge during the operation of the mower is turned down in such a manner that the mower blades do not take effect on same. It has thus been necessary, and the practice heretofore, to make a separate operation of such edging, the same being accomplished ordinarily by grass shears designed for the purpose. Such operation is, however, tedious and tiresome not only on account of the operation of the shears themselves, but because of the necessity of the operator stooping over in order to use same. It is to the provision of an attachment for a lawn mower designed to overcome these difficulties and enable the lawn mower itself effectively during its normal operation to trim the edges, that my invention is principally directed.

Further objects of my invention will appear from the following detailed description thereof:

In the drawing:

Figure 1 is a perspective view illustrating my new attachment as applied to a lawn mower.

Figure 2 is a top view of the device.

Figure 3 is a side elevation of the attachment.

Figure 4 is a section illustrating the method of brush renewal.

Having reference principally to Figures 2 and 3 of the drawing, my device consists of an arm constructed of sections 1 and 2. The section 2 is slotted as shown at 3, and the sections are adjustably bolted together, so that the overall length of the arm may be adjusted. The end of section 2 is bifurcated, and the forks 4 and 5 are provided with notches 6 adapted to fit over the cross rod 7 of lawn mower 8, the assembly being shown in Figure 1. The forks 4 and 5 are provided with pivoted lugs 9 adapted to engage under rod 7 so as to secure the assembly. The free end of section 1 of the arm is provided with a bearing 10 for a short shaft 11. The shaft 11 carries a member 12. The member 12 has a bearing for a sleeve 13 which is adapted to rotate in a vertical plane parallel with the arm 1—2. The forward end of the sleeve 13 is provided with a bevel gear 14 which intermeshes with a bevel gear 15 secured to the hub of a traction wheel 16, the hub 17 of the latter being rotatable on the axis 18 provided by the shaft 11.

The numeral 19 indicates a brush of generally conical shape, but which is concaved in section, as shown at 20, toward the point in order to permit the rotating of blades of the mower just to clear the brush during operation. The brush 19 is built on a braided wire core 22 in the usual manner. The shank 23 of said core is adapted to extend through sleeve 13, and the end thereof is bent as shown at 24 to engage in a notch in the outer face of the bevel gear 14; the brush, therefore, rotates with the gear 14 and sleeve 13. When assembled on the lawn mower 8, the sections 1 and 2 of the arm are adjusted so that the tip 25 of the brush extends under the fixed cutting blade 26 of the lawn mower, as clearly shown in Figure 1. The traction wheel 16 may be provided with a rubber or other tire 27 to provide ample friction.

The use and operation of my new attachment are as follows:

The attachment may be left fixed to the mower during the cutting of the major portion of the lawn, if desired, as it may be readily rotated around the rod 7 as indicated in dotted lines in Figure 1, resting on the handle fork of the mower. In such position it is inoperative itself and does not interfere with the ordinary use of the mower.

When it is desired to trim along the edge of the walk, drive or similar structure the attachment is rotated to the position shown in Figure 1 and may be moved longitudinally along the rod 7 to such position as will render it most effective, reference being had to the necessary traction of the wheels 27 of the mower, and the proper location of the brush along the edge to be trimmed. The mower is then handled in the usual manner. During such operation the traction wheel 16 operates the brush in counterclock-wise direction as viewed from the front of the mower and attachment, through the gears 15 and 14 and sleeve 13. The brush thus rotating lifts the grass along the edge of the walk and brushes it into the path of the cutting blades 21 and 26 of the mower, which, of course, trim the same as desired.

If the operator does not wish to have the attachment on the mower at all times it may be readily removed by opening the lugs 9 and lifting the forks 4 from the rod 7. Subsequently it may be as readily reinstalled for immediate use when wanted.

It will be seen by reason of the adjustability provided by sections 1 and 2 of the mounting arm, that the attachment may be adapted to any lawn mower within reasonable limits, and therefore, a single attachment may be made to serve on various sizes of mowers.

It will also be noted that as the brushes wear out they may be readily replaced merely by straightening the bent end 24 of the shank, removing the old, worn brush and installing a new one in its place, which in turn is fixed for rotation by bending its end 24 into the face of gear 14.

While I have described a preferred form of construction it will be understood that I deem as of my invention all such modifications and variations of such construction as come fairly within the purview and scope of the approved claims.

Having thus fully described my invention, what I claim as new and desire to secure by Letters Patent is:

1. A device of the character specified comprising a brush, means for mounting said brush on a lawn mower on an axis disposed at an angle with respect to the cutting elements of said mower, and means for rotating said brush.

2. A device of the character specified comprising a brush, means for mounting said brush on a lawn mower on an axis disposed at an angle with respect to the cutting elements of said mower, and a traction wheel for rotating said brush.

3. In combination with a lawn mower, a brush, means for mounting said brush on said mower so as to travel on an axis disposed at an angle with respect to the cutting elements of said mower, and means for rotating said brush.

4. In combination with a lawn mower, a brush, means for mounting said brush on said mower so as to travel on an axis disposed at an angle with respect to the cutting elements of said mower, and a traction wheel for rotating said brush.

5. In combination with a lawn mower, an arm rotatably mounted on said mower, a bearing member rotatably mounted in said arm, a brush rotatably mounted in said member, and means for rotating said brush.

6. In combination with a lawn mower, an arm rotatably mounted in said mower, a bearing member rotatably mounted in said arm, a brush rotatably mounted in said member, a traction wheel rotatably mounted on said bearing member, and means whereby said wheel is arranged to operate said brush.

7. In combination with a lawn mower having stationary and movable blades, an arm rotatably mounted on said mower, a bearing member rotatably mounted in said arm, a brush rotatably mounted in said member in front of said movable blades, said brush having a free end under said stationary blade so as to be prevented from lifting, and means for rotating said brush.

8. In combination with a lawn mower having stationary and movable blades, an arm rotatably mounted on said mower, a bearing member rotatably mounted in said arm, a brush rotatably mounted in said member in front of said movable blades and with its free end under said stationary blade so as to be prevented from lifting, a traction wheel rotatably mounted on said bearing member, and means whereby said wheel is arranged to operate said brush.

9. In combination with a lawn mower, an arm rotatably and slidably mounted on said mower, a bearing member rotatably mounted in said arm, a brush rotatably mounted in said member, and means for rotating said brush.

10. In combination with a lawn mower, an arm rotatably and slidably mounted in said mower, a bearing member rotatably mounted in said arm, a brush rotatably mounted in said member, a traction wheel rotatably mounted on said bearing member, and means whereby said wheel is arranged to operate said brush.

11. In combination with a lawn mower having stationary and movable blades, an arm rotatably and slidably mounted on said mower, a bearing member rotatably mounted in said arm, a brush rotatably mounted in said member in front of said movable blades, said brush having a free end under said stationary blade so as to be prevented from lifting, and means for rotating said brush.

12. In combination with a lawn mower having stationary and movable blades, an arm rotatably and slidably mounted on said mower, a bearing member rotatably mounted in said arm, a brush rotatably mounted in said member in front of said movable blades, said brush having a free end under said stationary blade, so as to be prevented from lifting, a traction wheel rotatably mounted on said bearing member, and means whereby said wheel is arranged to operate said brush.

ERNEST ALBERT GAST.